United States Patent

[11] 3,542,043

| [72] | Inventor | Richard L. Every<br>Ponca City, Oklahoma |
|---|---|---|
| [21] | Appl. No. | 803,101 |
| [22] | Filed | Feb. 27, 1969 |
| [45] | Patented | Nov. 24, 1970 |
| [73] | Assignee | Continental Oil Company<br>Ponca City, Oklahoma<br>a corporation of Delaware |

[54] METHOD FOR TRANSPORTING TWO IMMISCIBLE FLUIDS BY PIPELINE
3 Claims, No Drawings

[52] U.S. Cl. .................................................. 137/1
[51] Int. Cl. .................................................. F17d 1/00
[50] Field of Search ........................................ 137/1, 13

[56] References Cited
UNITED STATES PATENTS

| 2,953,146 | 9/1960 | Gordon ...................... | 137/1 |
| 3,198,201 | 8/1965 | Every .......................... | 137/1 |

Primary Examiner—Alan Cohan
Attorneys—Joseph C. Kotarski, Henry H. Huth, Jerry B. Peterson, William A. Mikesell, Jr. and Carroll Palmer ABSTRACT: Two fluids which are mutually immiscible, such as a hydrocarbon and an ammonium polyphosphate solution, are transported through a pipeline by interposing two buffer slugs, the first comprising a liquid miscible with one of the fluids and the other of the slugs but immiscible with the other of the fluids, and the second comprising a liquid miscible with the first slug and the other fluid but immiscible with the one fluid.

METHOD FOR TRANSPORTING TWO IMMISCIBLE FLUIDS BY PIPELINE

This invention relates to a method for simultaneously transporting two fluids which are immiscible in each other through a common pipeline. Differently described, the invention relates to a method for preventing or substantially reducing overriding or stratification of the type which occurs at the interface between two contiguous, immiscible fluids which are being moved through a pipeline.

There is described in U.S. Pat. No. 3,198,201 to Richard L. Every et al, and issued Aug. 3, 1965, a process for transporting two mutually immiscible fluids in a pipeline by interposing between the fluids a liquid miscible in both fluids as a buffer, and the disclosure of such patent is hereby incorporated by reference. It has now been discovered, however, that there exist pairs of mutually immiscible fluids which would be amenable to transport by pipeline except that no single buffer liquid can be found which is miscible with both liquids and is sufficiently inexpensive to permit its use in such manner.

A major object of the present invention is to provide a method for efficiently transporting two immiscible fluids substantially simultaneously through a common pipeline.

Another object of the present invention is to provide a method for efficiently transporting two immiscible fluids substantially simultaneously through a common pipeline wherein at least one of said fluids has a Reynolds number above about 2,000.

An additional object of the invention is to eliminate or substantially reduce the vertical stratification or overriding which occurs when two immiscible fluids are transported in a common pipeline.

Other aspects, objects, and the several advantages of the invention will become apparent upon study of this disclosure and the appended claims.

According to the invention, I have discovered that two mutually immiscible fluids for which no single buffer liquid, mutually miscible in both fluids, is conveniently available can be transported by pipeline by a process comprising interposing between the two fluids at least two slugs of different buffer liquids in a manner as to form a miscibility gradient.

Stated in another manner, assume two mutually immiscible fluids A and D which are to be transported through a pipeline. Further assume that no one liquid can be found which is miscible in both fluids A and D. According to the invention, at least two buffer liquids B and C are chosen and are interposed between fluids A and D so that the fluids injected into the pipeline are in the order A:B:C:D. Buffer liquid B is selected so as to be miscible with A and C, but not D, and buffer liquid C is selected so as to be miscible with B and D, but not with A. The fluids are then transmitted through the pipeline at a velocity sufficient to obtain turbulent flow.

The intermediate or buffer fluids which are employed may be either more viscous, substantially equally viscous, or less viscous than either or both of the fluids which they separate. The difference in density between the intermediate and separated fluids may also be either slight or great. In other words, relative viscosity and density do not appear to the critical properties of the intermediate fluids or buffer fluids. Moreover, whether one or both of the two separated fluids, or of the two or more buffer fluids, or all fluids are in laminar or turbulent flow, that is, have a Reynolds number more or less than about 2,000, does not appear to affect the solution to the problem of overriding.

In a more specific but nonlimiting aspect, the invention comprises interposing between two immiscible fluids which are to be transported in a common pipeline, a third and a fourth buffer or intermediate fluids, each of which are miscible with the other and with one of the two fluids being transported, and which may be easily separated or recovered from the fluids being transported after the transport is completed. For instance, if a choice of buffer fluids is available, other factors being equal, preference will ordinarily be given to those which have boiling points which differ from each other and from those of the two primary fluids being transported by an amount sufficient to permit separation by distillation.

The quantity of buffer fluids utilized will be dependent upon the diameter of the pipeline, the rate of fluid flow, and the distance of travel of the fluids. In general, the quantity of each buffer fluid should be sufficient to assure that the other buffer fluid and the primary fluid which it separates cannot come in contact with each other. As a rule of thumb, the quantity of each buffer fluid which should be used is that amount which is approximately equal to twice the volume of the interface which will exist between it and the fluid ahead of it after the fluids have travelled over the distance which they are to be transported.

Examples of suitable buffer or intermediate fluids include but are not limited to water, various alcohols such as methanol, ethanol, isopropanol, n-butanol and amylalcohol, acetone and other low molecular weight ketones, dioxane, diethylamine and other low molecular weight alkyl amines.

An example of primary mutually immiscible fluids to be transported include on the one hand ammonium polyphosphate fertilizer solutions with or without other nutrient materials such as urea, ammonium nitrate, and potassium chloride solids in suspension and with or without a suspension aid such as a clay, and on the other hand, various hydrocarbons such as crude oil or gasoline.

As an example, an ammonium polyphosphate fertilizer solution of nutrient grade 10-34-0, and gasoline, are to be transported through a pipeline. The fertilizer solution is followed by a water buffer, which in turn is followed by an ethanol, isopropanol, or acetone buffer, which finally is followed by the gasoline. It will be noted that no single inexpensive buffer is available which is miscible with both the gasoline and the fertilizer solution, and that the fertilizer solution and gasoline are mutually immiscible. However, the water buffer is miscible with both the fertilizer solution and the low molecular weight alcohol or acetone but not the gasoline, while the low molecular weight alcohol or acetone buffer is miscible with both the water buffer and the gasoline but not the fertilizer solution, thus forming a miscibility gradient.

While particular embodiments of the invention have been described, it will be understood, of course, that the invention is not limited thereto, since many modifications may be made; and it is, therefore, contemplated to cover by the appended claims any such modification as falls within the true spirit and scope of the invention.

I claim:

1. The method of transporting by pipeline two mutually immiscible fluids for which no single liquid miscible with each of said two immiscible fluids is available which comprises interposing between said two immiscible fluids two mutually miscible buffer liquids, one of which is miscible with the first of said immiscible fluids but not the second, and the other of which is miscible with said second but not said first, thus providing a miscibility gradient between said immiscible fluids, and pumping said fluids and said liquids contiguously through said pipeline.

2. The method of claim 1 wherein said buffer liquids are further characterized by being easily separable from each other and from said immiscible fluids.

3. The method of claim 1 wherein said immiscible fluids comprise respectively an ammonium polyphosphate solution and a hydrocarbon, and said two buffer liquids comprise respectively water and low molecular weight organic compound selected from the group consisting of alcohols and ketones.

Dedication 3,542,043.—*Richard L. Every*, Ponca City, Okla. METHOD FOR TRANSPORTING TWO IMMISCIBLE FLUIDS BY PIPELINE. Patent dated Nov. 24, 1970. Dedication filed Feb. 14, 1974, by the assignee, *Continental Oil Company*.

Hereby dedicates to the Public the entire remaining term of said patent.
[*Official Gazette October 15, 1974.*]